May 5, 1931.  M. P. WINTHER  1,804,193
GENERATOR AXLE DRIVE
Filed Oct. 7, 1929   7 Sheets-Sheet 1

Fig. 1.

Inventor
Martin P. Winther
By Oscar Hochberg.
his Attorney.

Fig. 4

May 5, 1931.                    M. P. WINTHER                    1,804,193
                              GENERATOR AXLE DRIVE
                             Filed Oct. 7, 1929        7 Sheets-Sheet 6

May 5, 1931.  M. P. WINTHER  1,804,193
GENERATOR AXLE DRIVE
Filed Oct. 7, 1929   7 Sheets-Sheet 7

Inventor
Martin P. Winther
By Oscar Hochberg
his Attorney

Patented May 5, 1931

1,804,193

UNITED STATES PATENT OFFICE

MARTIN P. WINTHER, OF WAUKEGAN, ILLINOIS, ASSIGNOR TO PULLMAN CAR & MANUFACTURING CORPORATION, OF CHICAGO, ILLINOIS, A CORPORATION OF ILLINOIS

GENERATOR AXLE-DRIVE

Application filed October 7, 1929. Serial No. 398,080.

The invention relates to a positive generator drive mechanism for railway cars wherein provision is made for operatively connecting a generator supported upon a car truck to an axle of the truck through the medium of an intermediate resilient transmission mechanism also carried by the truck.

Heretofore, in railway cars wherein the generator driving means has been the car axle, the practically universal method employed involved the use of pulleys on the axles and belts connecting them with the generators. With the very definite maximum energy source thus available, it has been found impracticable to obtain dependable capacity from one operating unit to meet all power requirements for lighting purposes.

The limitations of the belt driven apparatus are ascribable to many causes, chief among which are belt slippage and breakage, and to the fact that in truck suspended generators the size of the driving pulley is limited by track conditions with respect to clearances. These conditions are responsible for losses occasioned by the sulphating of the storage batteries from undercharging as a result of the insufficient speed of the generator and directly affect the cost of maintenance and generator output.

With the wheel sizes prevailing it has been found that the practical limit of power available from belt installations is five kilowatts, but with the development of electric refrigeration, ventilation, temperature and humidity control, and kitchen apparatus, comes a demand for an even greater supply of energy than can be obtained by multiple installations of belt driven generator equipment. With such increased demand upon the power equipment it becomes impracticable to carry storage batteries of sufficient capacity to carry the load for even short periods and indicates the necessity for greater reliability and capacity of the energy source.

The present invention has been developed to provide an assured output of energy in sufficient volume to meet present day railway service requirements, and has for its principal object the provision of a resilient though positive driving connection between axle and generator as a substitute for the belt connection heretofore used.

A further object is to provide a drive adapted for mounting upon a standard rough turned tapered car axle without keying against lateral or angular movement on the axle, and without the necessity for removing the wheels from the axle to effect an installation.

A further object is to provide a positive drive having a minimum gear train connection permitting compensating movement between axle and generator.

A further and important object is to provide a positive resilient connection between generator and axle embodying a centrifugally controlled automatic clutch mechanism permitting a gripping engagement with the generator drum at high speeds and a slipping contact at predetermined lesser speeds.

A still further object is to provide a positive resilient axle drive mounted upon a car truck and protected by a closed housing flexibly connected to the truck frame to permit the housing to follow axle motion, and carrying suitable lubricator mechanism.

The foregoing and other objects are attained by the mechanism illustrated in the accompanying drawings, in which

Figure 6 is a sectional view through the horizontal axes of the driving gear on the axle and the flexible transmission connecting the gear and generator taken on line 6—6, of Figure 4, showing the method of mounting the transmission in bearings supported by the housing;

Figures 7 and 8, show respectively, the lock washer and retaining ring, and Figure 9, the spanner nut assembled with the washer and ring for holding the generator driving drum and flexible coupling spider on the splined end of the generator shaft and the ball bearings and pinion on the pinion sleeve, as shown in Figure 6;

Figure 1:
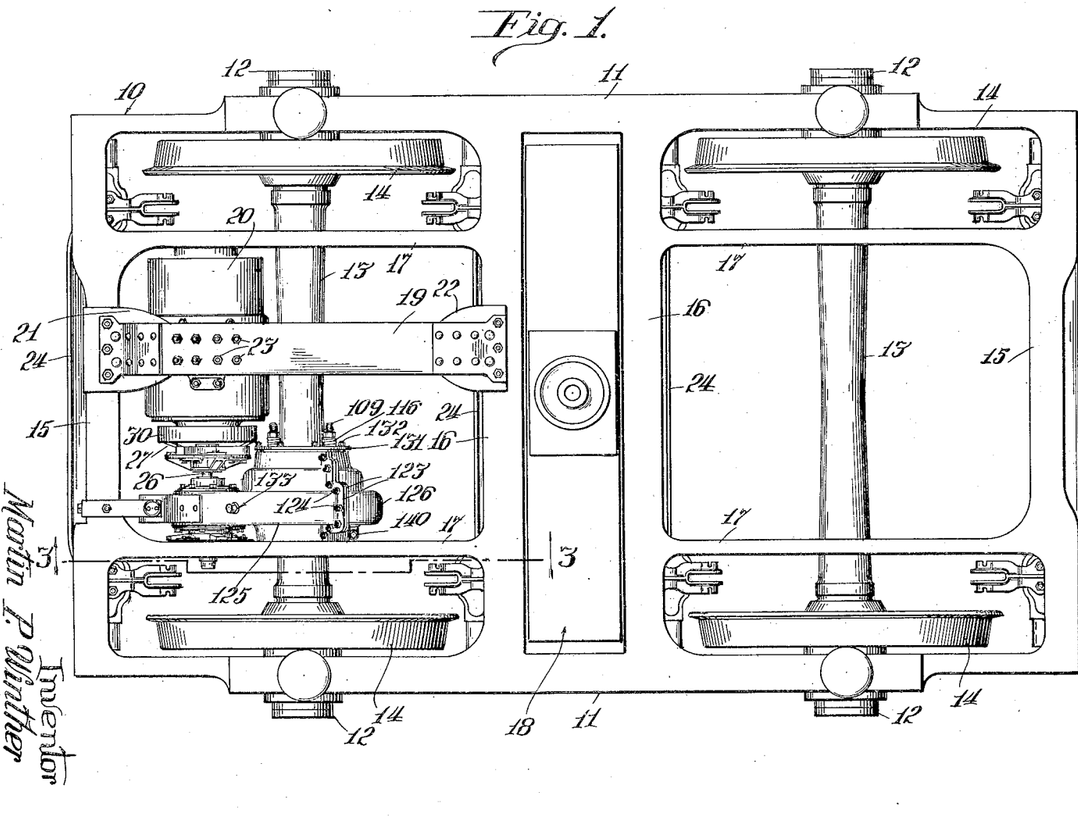
Figure 1 is a plan view of a car truck equipped with one embodiment of the generator and drive of the invention showing the position of the mechanism with respect to the truck frame parts and the brake beams.
Figure 2:
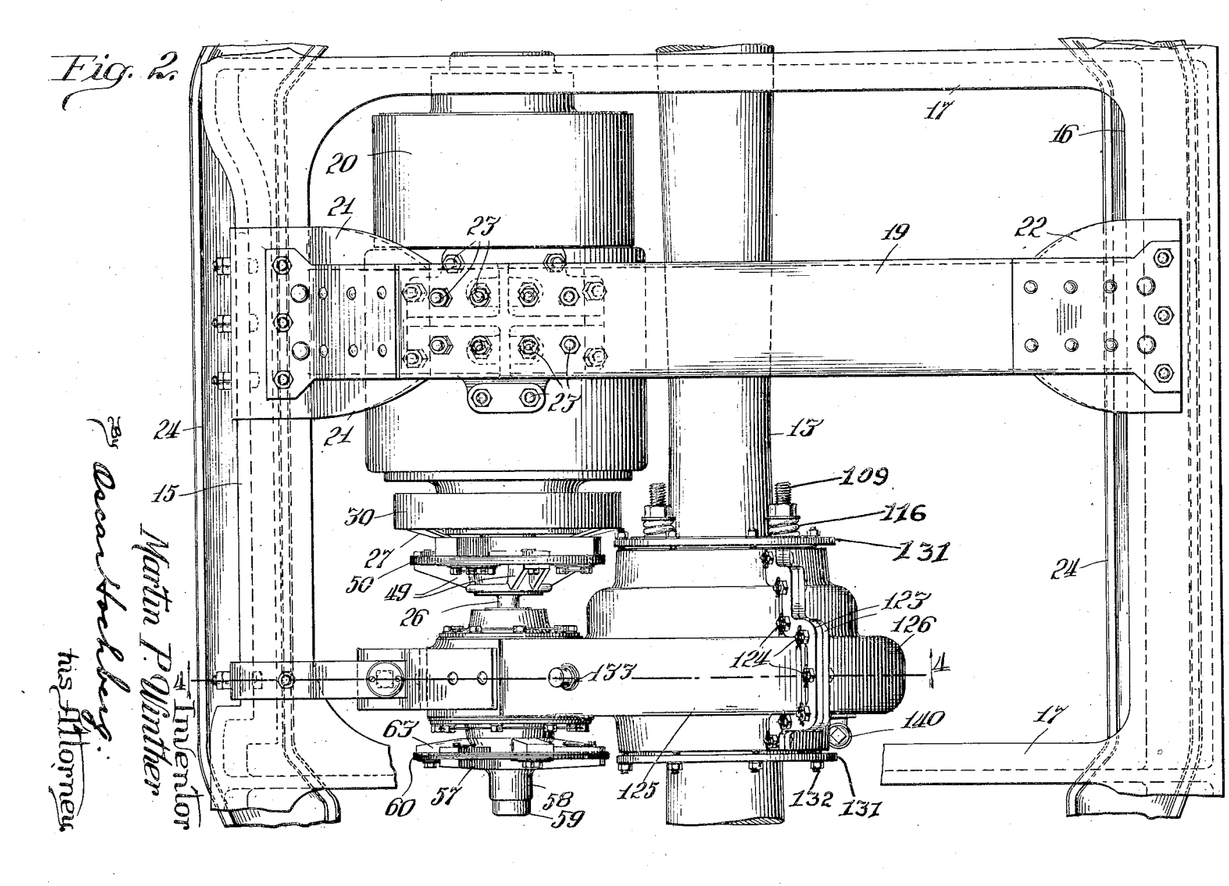
Figure 2 is a similar enlarged view of a portion of the truck showing the mechanism and supporting means in greater detail.

In said drawings, 10 represents the truck frame of a truck equipped with one embodiment of the invention, comprising the side wheel pieces 11 supported upon journal boxes 12 mounted upon the ends of standard rough turned tapered axles 13 fitted with wheels 14, all as heretofore commonly used. The side pieces are connected by end sills 15 at their ends and by intermediate transoms 16, the respectively adjacent end sills and transoms being tied together by the usual axle guards 17, as best shown in Figures 1 and 2, the customary bolster 18 being movably supported between the transoms. The driving unit is mounted upon the truck and so disposed as to clear the frame members noted during the assembling operation and after the installation has been effected.

As indicated in the drawings, the generator 20 is mounted on an axis substantially parallel to adjacent axle 13 and supported on the truck frame by a bridge member 19, preferably channel shaped in cross-section, removably secured to and spanning the space between end sill 15 and adjacent transom 16.

As shown in Figures 1 to 5, inc., the bridge is fitted at its opposite ends with brackets 21 and 22 bolted to respectively adjacent sill and transoms. The generator is demountably secured to the bridge by bolts 23 in position to permit ample room for operating movements of brake beam 24 and levers 25 of the brake rigging and the wearing down of brake shoes and wheels as indicated in these figures.

Figures 5, 13:
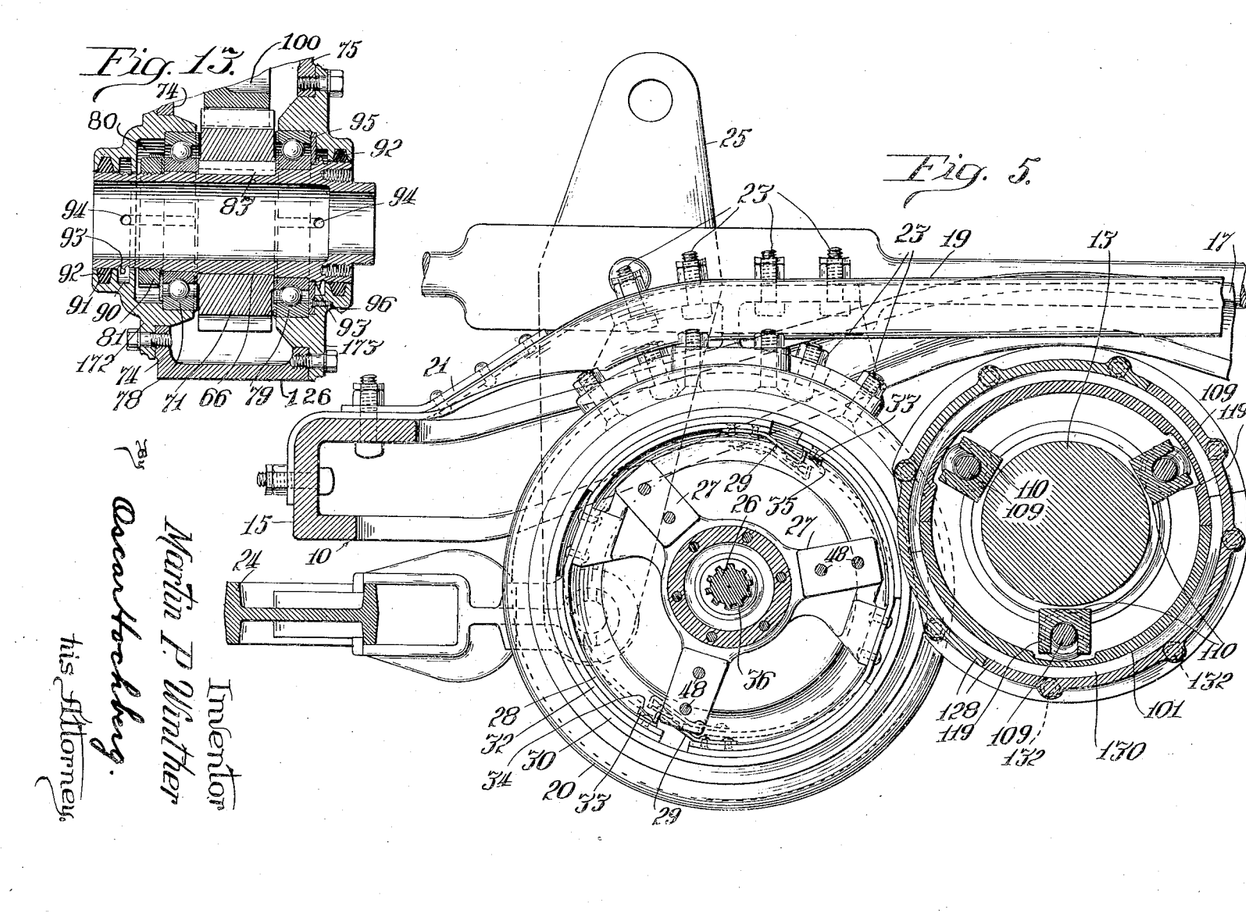
Figure 5 is a similar view taken on line 5—5, of Figure 6, through the flexible coupling and clutch spider on the generator shaft and driving gear hub and attachments on the axle, showing the associated clutch mechanism with parts arranged for quick release from the generator drum to permit the generator to be run as a motor from the car lighting batteries for testing purposes.
Figure 13 is a fragmentary view similar to Figure 6, showing a modified and preferred form of sleeve, bearing cap, and packing, with means for returning oil at the packing to the gear housing.
Figures 6, 7, 8, 9:
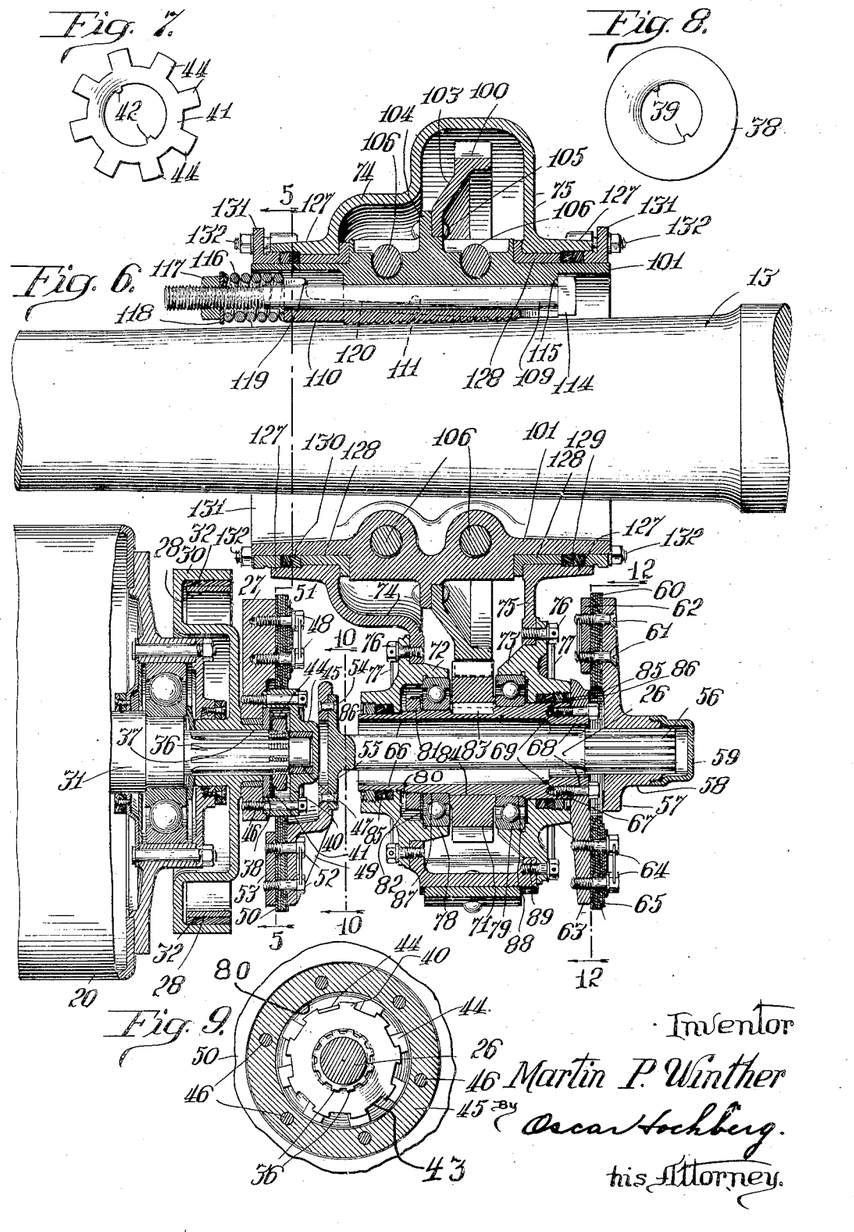
Figures 10, 11, 12:
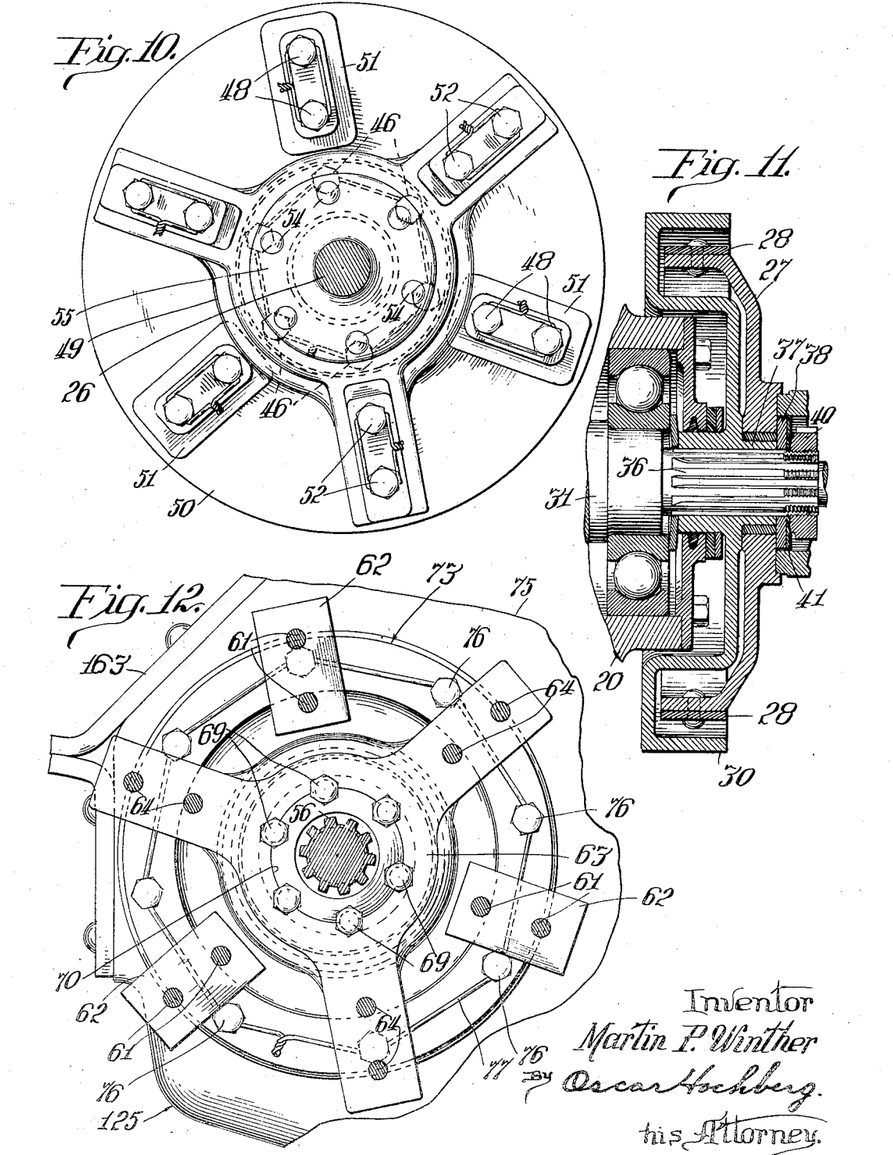
Figure 10 is an elevation of the flexible thermoid disc and supporting spider secured to the coupling shaft of the transmission mechanism for connecting the transmission to the generator, and taken on line 10—10, of Figure 6.
Figure 11 is a view similar to Figure 6, on larger sale, showing the generator driving drum and associated clutch spider with clutch springs attached.
Figure 12 is a vertical sectional view taken on line 12—12, of Figure 6, showing the flexible coupling spider at the outer end of the coupling shaft with the thermoid disc removed.

The generator is axially assembled with and flexibly coupled to a resiliently mounted transmission mechanism, the driving shaft 26 of which is flexibly coupled to the generator by clutch spider 27. The clutch spider 27 is fitted with clutch springs 28 secured at their middle upon diametrically opposite sides of the spider and arranged with their opposite ends normally bearing against an associate driving drum 30 fixed to the splined end of generator shaft 31 as best shown in Figures 5, 6, and 11. The springs 28, from points on opposite sides of their respective centers, are lined with fabric clutch bands 32 to insure positive and extended engagement with the generator driving drum 30 when forced outwardly during relatively high rotative speeds of driving shaft 26. At predetermined lower rotative speeds the clutch springs 28 bear with sufficient friction on the generator drum to drive the generator by virtue of the spring pressure alone.

As the rotative motion of the driving shaft 26 increases, the pressure exerted by the springs under the action of centrifugal force proportionately increases the friction between the clutch bands 32 and generator drum 30 on the order of the square of the rotative speed, and the engagement between the generator drum and clutch bands becomes fully positive for all practical purposes at speeds above those at which car coupling is feasible. At the lower speeds, the friction between the bands and drum is relatively small and shocks due to coupling of cars or severe brake applications will cause slippage of the clutch bands and drum to prevent shock to generator armature and bearings or possible disruption of the generator supporting gear resulting from a sudden stoppage of the generator.

Provision is made for manually releasing the clutch bands from contact with the generator drum to permit the generator to be run as a motor from the storage batteries for the purpose of testing it. As best shown in Figure 5, the opposing ends of the respective clutch springs 28 are normally spaced apart when operatively engaging the generator drum to permit the springs to be drawn inwardly and towards each other and held locked and out of contact with the generator drum. The opposing ends may be held locked in various ways, that indicated in the drawing involving the use of juxtaposed hooks 29 and anchor blocks 33 respectively secured to the opposite ends of the several springs, so that when the opposing ends have been drawn together as indicated in broken lines in this figure, the springs will be held clear of the generator drum and the drive disconnected. This operation is initiated by inserting an edged tool between the ends of clutch bands 32 and generator drum 30 and forcing adjacent ends of the bands 32 and springs 28 inwardly and away from the generator drum.

As the ends move inwardly, they approach each other, causing the hook 29 on one of the ends to move along the contiguous inclined face 34 of the anchor block 33 on adjacent end of opposing spring until the hook moves into engagement with shoulder 35 on the anchor block, as shown in the broken line position of these parts in Figure 5, whereupon the clutch band will be held locked in position away from the generator drum to permit independent operation of the generator as a motor, as hereinbefore noted.

The generator drum 30 is kept from rotation upon generator shaft 31 by splining the hub of the drum to interfit with the splines 36 on the end of the generator shaft. The drum hub is formed with an extended portion 37 upon which is rotatably mounted the spider 27 supporting the clutch springs 28. The spider 27, and through it the generator drum 30, is held in position upon the generator shaft by retaining ring 38 shown in Figure 8. The ring is formed with inwardly projecting radial lugs 39 for engagement with splines 36 upon the generator shaft, and is itself held by spanner nut 40 threaded upon splines 36 and held from rotation after adjustment by lock washer 41 shown in Figure 7.

The lock washer is positioned between the spanner nut and retaining ring 38 and, like the retaining ring, is held from rotation upon the generator shaft by radial lugs 42. The nut periphery is formed with notches 43 spaced at intervals of about 40° and adapted to receive one of the teeth 44 radially disposed at intervals of about 45° on lock washer 41 bent to engage one of the notches 43 to hold the spanner nut from rotation. The relative difference in angularity of the teeth and notches on lock washer and spanner nut will permit accurate adjustment of the spanner nut with respect to the clutch mechanism and generator shaft.

To prevent the pinching of the generator drum hub upon the splines of the generator shaft resulting from pressures exerted by spider 27 induced by relative angular shifting of the driving shaft 26 of the transmission mechanism to which the spider is flexibly coupled, provision is made for balancing the spider upon the generator shaft by means of a bearing cap 45 secured to the spider by screws 46 tapped into it, as best shown in Figure 6. As indicated in this figure the cap is cup shaped and arranged to have a running fit upon a reduced extension 47 of the generator shaft 31 in position to transmit excessive strains from the spider to the generator shaft at a point removed from the hub of the spider.

The clutch spider 27 is flexibly coupled to a second spider 49 on driving shaft 26 by a flexible disc 50 held between said spiders by screws 48 taking the legs of spider 27, the disc, and wear plates 51, and by screws 52 taking securing plates 53, the disc, and the legs of spider 49, as best shown in Figures 6 and 10. Spider 49 is rigidly secured by rivets 54 to circular head 55 formed on the driving shaft 26. The disc 50 is preferably of multi-ply fabric and rubber vulcanized, and of sufficient strength to transmit the driving energy of shaft 26 to the generator shaft 31 through the spiders 27 and 49.

Figure 3:
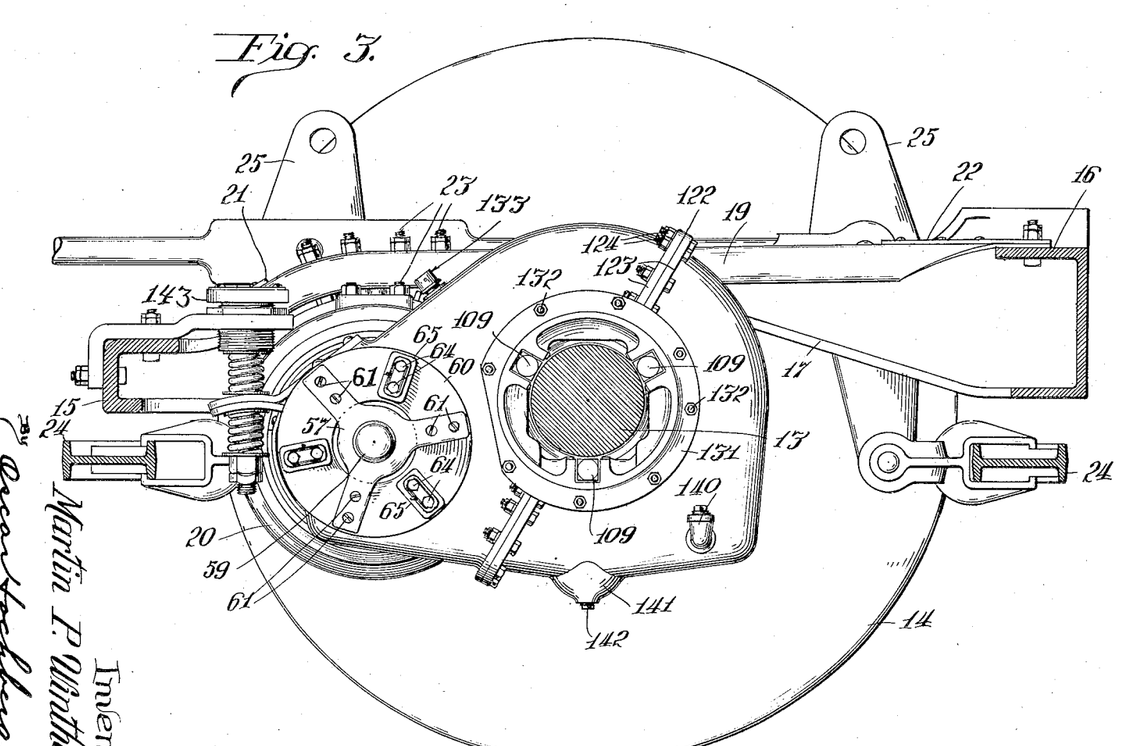
Figure 3 is a vertical sectional view through the truck frame and axle taken on line 3—3 of Figure 1, showing an end elevation of the drive mechanism and housing.

Driving shaft 26 at its opposite or outer end 56 is splined to provide a slidable through positive connection between it and spider 57. The spider is provided with a closed hub 58 having its bore splined for interengagement with the splined end of shaft 26, as best shown in Figures 3 and 6, to permit relative end movement between the parts, and to provide a dust protecting cover and lubricant retainer for the connection. As indicated in Figure 6, spider hub 58 may be fitted with a removable closure 59 threaded upon the spider hub, or the cap may be formed integral with the hub, as desired.

Secured to spider 57 is a flexible coupling disc 60 of the type indicated for disc 50 at the clutch end of the driving shaft, and held by screws 61 taking spider 57, the disc 60, and securing plates 62. The coupling disc 60 is further secured to another spider 63 disposed on the inner side of said disc and held by screws 64 taking the spider 63, disc 60, and wear plates 65. The spider 63 is also rigidly secured to adjacent thickened end of a pinion sleeve 66 in concentric alignment with the driving shaft 26. The end of the pinion sleeve is reduced to provide an annular shoulder bearing 67 and seat portion 68 for the spider 63, as shown in Figure 6.

The spider is secured to the pinion sleeve by head screws 69 tapped into shoulder 67. As best indicated in Figure 12, the holes for head screws 69 are arranged with their centers coinciding with the spider seat 68 on the pinion sleeve 66 and the sleeve bearing portion 70 on the spider so that the shanks of the screws will have partial bearing upon each in the same lateral planes and act to interlock said parts against relative rotation. The sleeve 66 carries the pinion element 71 of the gear train and is rotatably supported in bearing caps 72 and 73 at opposite ends of the sleeve and respectively secured to adjacent side walls 74 and 75 of a gear housing hereinafter to be described.

As the pinion sleeve is held in fixed parallel relation to the axle, it must follow axle motion during the endwise and lateral weaving movements of the axle, and is therefore proportioned to provide ample room about the driving shaft 26 to permit compensating movement between said parts and said parts with respect to the generator within the flexing range of the coupling discs 50 and 60. The bearing caps 72 and 73 are removably held in their respective housing walls 74 and 75 by head screws 76 tapped into the walls and held against rotation in any suitable manner, preferably by a strand of heavy wire 77 threaded through openings in the screw heads, as best shown in Figures 6 and 12, and drawn taut.

The respective caps 72 and 73 have their inner faces recessed to snugly receive ball bearings 78 and 79 having a snug fit upon sleeve 66 on opposite sides of pinion 71. Cap 72 is formed with a secondary recess or pocket 80 to accommodate locking nut 81 threaded upon sleeve 66, and lock washer 82, for holding the pinion and ball bearing assembly upon the sleeve as will presently appear. The respective ball bearings 78 and 79 are assembled with their inner and outer races having a snug floating fit upon sleeve and bearing caps whereby the races will be permitted to creep upon their respective seats to reduce the wear of both races and seats to avoid a premature breakdown of the assembly, the pinion 71 being positioned between the ball bearings and held against rotation on the sleeve by key 83 taking the pinion and pinion seat 84 as indicated in Figure 6.

The pinion sleeve is tapered along its outer periphery from the end secured to coupling spider 63 to the opposite end, the tapering being effected through the medium of stepped seat areas of successively decreasing diameters from the relatively large end at the spider inwardly towards the generator. Since the ball bearings 78 and 79 flank the pinion 71, the seat 87 for the bearing 78 is of smaller diameter than the pinion seat 84, and the seat 88 for the bearing 79 upon opposite side of the pinion is of relatively greater diameter than either.

The housing wall 75 is provided with opening 89 of sufficient size to admit pinion sleeve 66 with pinion 71, the ball bearings, and bearing cap 73, held in grouped relation by spider 63 and locking nut 81, whereby the entire pinion mechanism as a unit may be assembled with the companion cap 72 in the other wall 74 of the housing. The spider 63 forms a constituent part of the flexible coupling comprising the disc 60 and companion spider 57, and by virtue of its engagement with bearing cap 73, co-operates with locking nut 81 to prevent endwise movement of the pinion with respect to the driving gear assembly hereinafter referred to.

To prevent the loss of lubricant contained within the housing through the joint between the ends of pinion sleeve 66 and bearing caps 72 and 73, the space is closed by packing rings 85 of flax or felt composition held in position by retaining rings 86 tapped into the respective caps. Such closure may also be effected by the construction shown in Figure 13, illustrating a modified and preferred form of sleeve and bearing cap in which the caps 172 and 173 are each provided with a plurality of annular grooves 90 and 91, outer grooves 91 of which are designed to receive a packing ring 92 of half hard close grain felt or the like, and the inner grooves 90 adapted to receive a fin 93 on the pinion sleeve 66 designed to return to the housing, accumulated oil finding its way to the packing ring by capillary attraction.

The oil is thrown off the fins by centrifugal force and delivered to their respective grooves 90, whence it is directed to the housing by drain openings 94 in the bottom of said grooves. As indicated in this figure the ball bearing thrust wall of bearing cap 173 is indicated in the form of a separate ring 95 secured to the cap by screws 96, but in all other respects the pinion assembly conforms to that shown in Figure 6, the separate ring being used to provide clearance for the oil fin 93 to permit assembling of said bearing cap with the sleeve 66.

Figure 4:
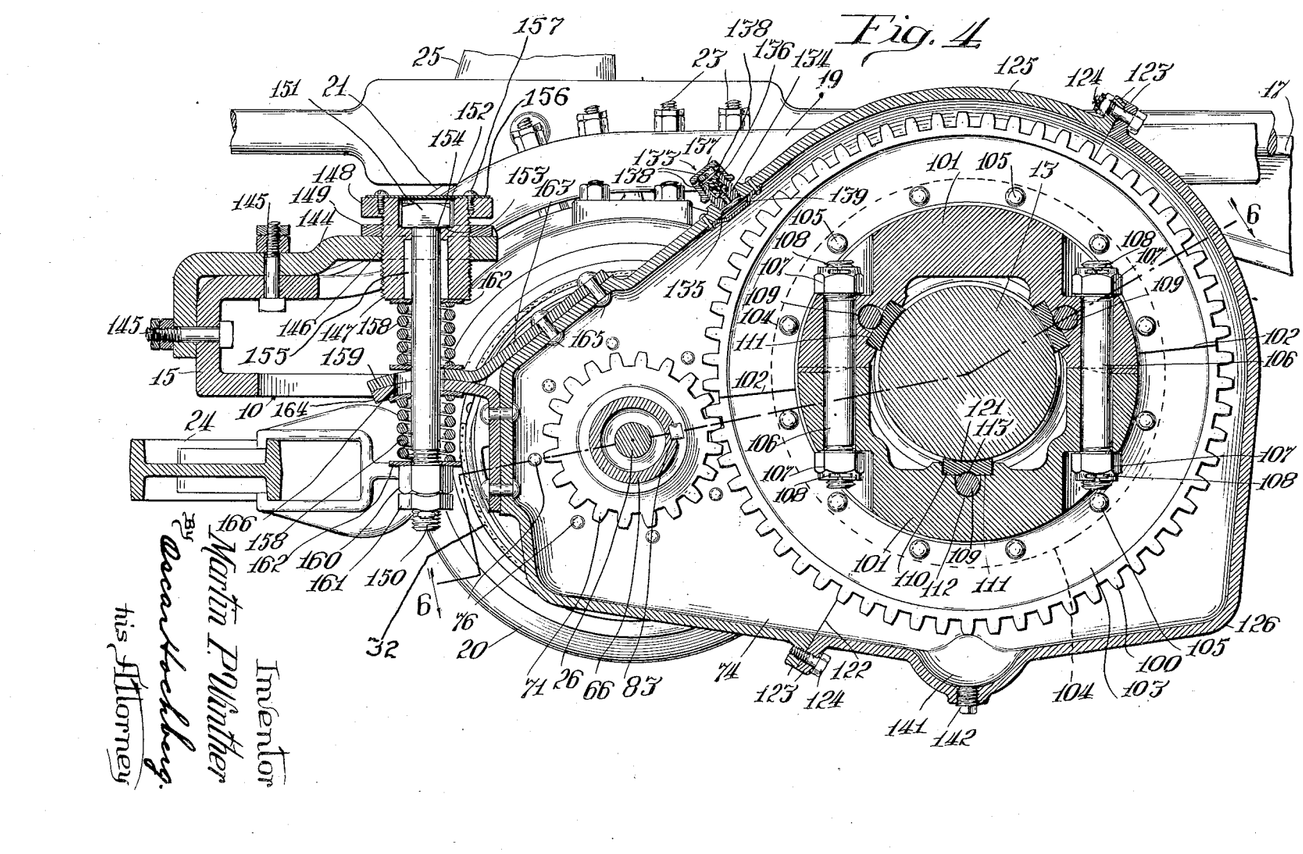
Figure 4 is a similar view taken on line 4—4, of Figure 2, through the drive mechanism and housing to show the gear train, drive gear mounting, and housing suspension.

The flexible transmission mechanism above described is driven by a spur wheel 100 in mesh with pinion 71 of the transmission and removably secured to axle 13 of the truck. The spur wheel is secured as an entirety to separate matched hub sections 101 to insure accuracy in assembling, and then split diametrically adjacent the line of division between the hub sections so that each hub section will carry a segment of the spur wheel for application to the axle. For this purpose, the spur wheel is made of hardened steel rendered divisible at relatively soft cutting areas 102 adjacent the wheel periphery as indicated in Figure 4.

The spur wheel is formed with an attaching web portion 103 by means of which it is secured to peripheral flanges 104 on the hub sections by rivets 105, as shown, or by welding, as desired. The hub sections 101 with their respective spur wheel segments, are held in paired relation upon the axle 13 by clamping bolts 106 arranged in pairs upon opposite sides of the axle, as indicated in Figures 4 and 6, and fitted at their respective opposite ends with slotted heads and nuts 107 adjustably held to the bolts by pins 108 taking the bolts through registering openings therein. In their assembled position on the axle, the hub sections and spur wheel segments complement each other to provide a unitary driving gear wheel of ample strength and proportions for transmitting the full tractive effort of the axle when mounted as hereinafter described.

The driving gear is mounted upon the axle in such manner as to automatically adjust itself to the axle contour and withstand vibration. This is accomplished by interposing a plurality of spring pressed wedges 110 between the assembled hub sections 101 and the axle. These are held in assembled relation by bolts 109 extending lengthwise of the axle and between the wedges and hub sections and adapted to adjust the wedges with respect to the axle and hub sections. The hub sections are formed with grooves 111 for the wedges and 112 for the bolts as best shown in Figures 4, 5, and 6.

It will be noted that the wedges 110 are also formed with grooves 113 arranged to complement the grooves 112 in the hub sections 101 to accommodate the bolts 109. The bolts are provided with heads 114 adapted to seat against abutments 115 on the respective hub sections, and spring coils 116 mounted upon the bolts between washers 118 at the nuts 117 and heads 119 on adjacent ends of the wedges 110 and seating against both to press heads 114 firmly upon their respective seats on the hub sections, the pressure thus exerted by the springs operating to urge the wedges inwardly along their respective grooves 111 in the hub sections.

In order to resolve the spring pressure into a force tending to move the hub sections away from the axle, the grooves 111 upon opposite sides of respective bolt grooves 112 are sloped throughout the length of the hub sections and adapted to engage correspondingly sloped sides 120 on the wedges at opposite sides of respective bolts 109, so that inward movement of the wedge sides 120 upon the relatively fixed sloping grooves 111 in the hub sections will force the wedges into positive engagement with the axle. To provide a gripping contact with the tapered rough-turned surface of the axle, if a tapered axle is used, the engaging faces 121 of the wedges are preferably serrated to prevent relative shifting of the wedges upon the axle and to insure positive transmission of the full tractive effort of the car wheels to the driving gear 100.

To prolong the useful life of the mechanism, the moving parts of the drive are protected from the elements and lubrication provided for by means of a housing divided diagonally upon a line passing through the longitudinal center of the axle, as best shown in Figures 1 to 4, inc., and 6, and comprising an upper and transmission bearing portion 125 and a lower underslung portion 126, connected together by bolts 124 extending through marginal sealing flanges 123 formed on the upper and lower housing portions.

The sealing flanges at their meeting faces are preferably ground and the joint 122 sealed with lead and oil to render it fluid tight. The housing is provided as a whole with side wall portions 74 and 75, as previously pointed out, in which are supported the roller bearing caps 72 and 73, respectively, supporting the flexible pinion mechanism. That portion of the housing above and below the joint 122 at the axle position is provided with annular bearing flanges 127 as clearly indicated in Figure 6, by means of which the housing is pivotally journaled upon the driving gear to permit relative movement thereof with respect to each other, the generator, and the track.

To properly support the housing at this position, the hub sections 101 of the spur gear wheel 100 are grooved to receive segmental bearing sleeve portions 128, angular in cross-section, to provide wear bushings for the housing bearing flanges 127, as will be understood. It will be noted that the housing bearing flanges 127 project outwardly beyond their respective bushings 128 to complement adjacent peripheral end portions of the hub sections 101 to form annular grooves 129 within which may be accommodated packing rings 130 and the flanges of segmental packing retaining glands 131 held to the respective bearing flanges 127 by headed screws 132 tapped into the housing. The bearing sleeve segments 128 are preferably held from rotation with driving wheel hub 101 by a dowel pin on the sleeve entered in an opening on the housing or in any other approved fashion, thereby avoiding possible wear upon the housing flanges 127 by the creeping action of floating sleeve segments.

To prevent oil leakage at the packing rings 130 and retaining glands 131 under pressure of expanding air caused by the heat generated in the housing, a breather plug mechanism 133 is provided on the housing to prevent the air pressure inside from rising above atmospheric pressure. As best shown in Figure 4, the breather comprises a perforated cup shaped plug portion 134 tapped into opening 135 in the housing 125 and containing hair 136 or other air filtering medium to prevent the entry of dirt or other matter thrown about by train movement.

A breather cap 137, having a series of perforations 138 in its side, is screwed to the plug to prevent loss of and protect the filtering agent. To prevent the splashing of oil into breather opening 135 in the housing by the centrifugal action of the gear train, a baffle plate 139 is secured over the opening on the inside of the housing and offset inwardly to permit free passage of air from the sides of the plate.

The housing is charged with lubricating oil from a single point through filler plug 140 in quantities sufficient to maintain an oil bath for the gears. The system may be drained through drain sump 141 at the bottom of the housing by the removal of plug 142.

The housing is prevented from rotating about the axle by a flexible and adjustable support 143 suspended from the end sill 15 of the truck frame and adapted to permit adjustment of the housing and thereby the pinion sleeve 66 with respect to the generator and driving shaft 26, to prevent possible interference between the shaft and sleeve caused by the wearing down of the truck wheels 14, and variations in the load upon the truck springs, and to enable the housing to follow axle motion. The support comprises a bracket 144 removably secured to the end sill of the truck frame and designed to overlap and conform to the angular shape of the end sill so that the bracket, when secured by the vertical and horizontal bolts 145, will be held from displacement vertically and laterally under stress of truck movement.

The bracket 144 is provided with an opening 146 of ample proportions tapped to receive a tubular adjusting screw 147 formed with an outwardly extending peripheral flange 148 at its upper margin, a lock nut 149 being threaded to the screw between said flange and bracket to insure permanency of adjustment of the screw. The screw supports a suspension bolt 150 held against rotation by a polygonal head 151 nested in a corresponding formed recess 152 in the screw. The screw is further constructed with a partition wall 153 formed with an opening 154 for the bolt and designed to reinforce the screw and provide a seat for the bolt head 151.

From beneath partition 153 the screw interior is cylindrical to its bottom edge to provide a chamber 155 relatively larger than the bolt opening 154 in the partition to afford ample clearance for bolt movement. After the bolt has been installed with its head 151 lodged in screw recess 152, it is held from vertical displacement and protected by a cover plate 156 secured by screws 157 tapped into the wall of the adjusting screw. Mounted on the bolt beneath adjusting screw 147 is a pair of coil springs 158 spaced apart vertically to accommodate the housing guard bracket 159 between them, the spring and bracket assembly being held by retaining nut 160 kept from rotation by lock nut 161.

At the ends of the spring coils 158, top and bottom, are spring support washers 162 designed to provide suitable seats for the springs, the washer immediately beneath the interposed guard bracket 159 being curved to conform to the shape of the bracket for a purpose presently to appear. The guard bracket 159 is preferably made up of separate plates welded together for a portion of their length and the remaining portions spread apart to provide attaching wings 163 and 164 by means of which the bracket is secured to the gear housing 125, by rivets 165 as shown, or by welding, as desired.

The welded portion of the bracket between the springs 158 and the washer 162 immediately adjacent the underside of said bracket are curved to a contour determined by the extent of the wear on the truck wheels and journal bearings and the vertical movement of the truck frame 10 resulting from the variation in the loads carried by the truck springs. As the wheels or journals wear, the relation between truck frame and axle varies, likewise the relation between generator driving shaft 26 and pinion sleeve 66 of the transmission. In both cases the pinion sleeve 66 tends to drop and lessen the clearance between it and the upper side of the driving shaft 26 and the driving shaft assumes objectionable angularities with respect to generator shaft 31 and the pinion sleeve due to the drop in the transmission end of the housing 125.

The correct operating relation between the several parts may be restored by turning up the retaining nut 160 and lock-nut 161 on the suspension bolt 150 to raise the bracket 159 and with it the housing and transmission for major adjustments and lifting the bolt 150 by the rotation of screw 147 for greater refinement of adjustment. This operation entails no shifting in the relation between the driving gear wheel 100 and pinion 71 since the pinion moves in a fixed orbit about the axle center and is maintained in constant meshing relation with the driving gear.

The portion of bracket 159 between the springs 158 is curved to prevent distortion of the springs during the up and down movements of the housing and provided with an opening 166 of sufficient size to allow the housing to follow axle movement, the adjacent washers above and below the bracket being adapted to cover the opening and insure a bearing for adjacent spring throughout the shifting range of the opening from one side of the bolt 150 to the other.

It will be noted that there has been provided a positive resilient drive, simple in construction and adaptable to standard rough turned tapering axles, and readily demountable, and in which the coupling between drive and generator needs no lubrication and is at all times in position to absorb rail shocks otherwise transmitted to the generator. The generator can be provided with either 4 k.w. or 5 k.w. armature and may be arranged to cut in at a train speed of 17 miles per hour instead of 26 miles per hour as on present equipment due to elimination of belt slippage common to belt transmissions. The drive and generator may be applied and removed without removing the wheels, and the wheels may be turned in center drive lathes without disturbing the drive.

What I claim is:

1. In a generator drive including a vehicle axle and a driving gear fixed to the axle, a generator having its longitudinal axis parallel therewith, pinion mechanism intermediate said gear and generator having a fixed orbit about said axle, clutch mechanism on said generator, and resilient transmission mechanism axially connecting said pinion and clutch mechanism.

2. In a generator drive including a vehicle axle and a driving gear fixed to the axle, a generator, clutch mechanism on said generator, pinion mechanism intermediate said gear and clutch mechanism movable in a fixed orbit about said axle and including a relatively movable driving shaft, and a flexible coupling axially connecting said shaft and clutch mechanism.

3. In a generator drive of the character described, a pinion assembly comprising a sleeve having a succession of seat areas, antifriction bearings spaced apart and movably mounted upon certain of said seats, a pinion fixed to said sleeve between said bearings, a generator driving shaft in concentric relation to said sleeve and pinion, and flexible couplings connecting said shaft with the generator and pinion sleeve.

4. In a generator drive of the character described, the combination including a vehicle axle, a housing pivotally supported on the axle and having registered openings in the respectively opposite side walls thereof, bearing supports removably mounted in said openings, antifriction bearings movably mounted in said supports, a pinion sleeve journaled in said bearings and movable in a fixed orbit about said axle, a pinion fixed to said sleeve between said bearings, locking means for retaining said bearings and pinion in grouped relation upon said sleeve, and means on said bearing supports and sleeve adapted to return to the housing any excess oil finding its way past the bearings.

5. In a generator drive of the character described, the combination including a vehicle axle, a housing pivotally supported on the axle and having registered openings of relatively different sizes in the respectively opposite side walls thereof, bearing supports removably mounted in said openings, antifriction bearings movably mounted in said supports, a pinion sleeve journaled in said bearings and having a stepped periphery forming a succession of seat areas of progressively different diameters, a pinion fixed to said sleeve between said bearings, and locking means for retaining said pinion and bearings in grouped relation upon said sleeve, the larger of said bearing supports forming a constituent of the pinion mechanism and being removable therewith from said housing.

6. In a generator drive of the character described, the combination including a vehicle axle, a housing pivotally supported on the axle and having registered openings in the respectively opposite side walls thereof, bearing supports removably mounted in said openings, antifriction bearings movably mounted in said supports, a pinion journaled in said bearings, circumferential oil fins on said pinion outside of said bearings, and drain openings in said bearing supports for returning excess oil to the housing.

7. In a generator drive for car trucks, the combination including an axle and a truck frame having an end sill and a transverse transom on respectively opposite sides of said axle, a generator between and in parallel relation to said frame members, a driving gear fixed to said axle, a housing for said gear pivotally supported on said axle with its free end adjacent said end sill, flexible transmission mechanism coupling said gear and generator and journaled in said housing, and suspension means on the end sill for resiliently supporting said housing and transmission.

8. In a generator drive of the character described, the combination including a housing for the drive, of a truck frame having an end sill, a flexible and adjustable support for said housing comprising a bracket projecting inwardly from said sill in the plane of the housing and provided with an opening adjacent its free end, a tubular adjusting screw tapped into said opening and formed with an inwardly extending annular reinforcing partition providing a support for a suspension bolt, a bracket on said housing formed with an outwardly projecting supporting portion extending below said screw and provided with an opening, springs above and below the opening in said housing bracket, a suspension bolt supported by and adjustable with said screw and extending downwardly thru said springs and housing bracket, and locking and supporting means carried by said bolt.

9. In a generator drive for car trucks, the combination including a truck frame having an end sill, an axle and a driving gear fixed to said axle, a generator, a housing for said gear pivotally supported on said axle with its free end adjacent said end sill and comprising upper and lower housing members meeting on a diagonal plane through the longitudinal center of the axle, flexible transmission mechanism coupling said gear and generator and journaled in said upper housing section, suspension means on said end sill for resiliently supporting said upper housing section and transmission, and means at the joint between said sections for removably securing them together.

In witness whereof I have hereto set my hand this 2nd day of October, 1929.

MARTIN P. WINTHER.